(12) United States Patent
Sun et al.

(10) Patent No.: US 12,726,911 B2
(45) Date of Patent: Sep. 1, 2026

(54) POWER CONTROL METHOD AND APPARATUS, AND USER EQUIPMENT

(71) Applicant: VIVO MOBILE COMMUNICATION CO., LTD., Chang'an Dongguan (CN)

(72) Inventors: Rongrong Sun, Chang'an Dongguan (CN); Peng Sun, Chang'an Dongguan (CN); Hao Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 516 days.

(21) Appl. No.: 18/349,773

(22) Filed: Jul. 10, 2023

(65) Prior Publication Data

US 2023/0354208 A1 Nov. 2, 2023

Related U.S. Application Data

(63) Continuation of application No. PCT/CN2022/071784, filed on Jan. 13, 2022.

(30) Foreign Application Priority Data

Jan. 15, 2021 (CN) ........................ 202110057780.3

(51) Int. Cl.
*H04W 52/14* (2009.01)
*H04W 52/10* (2009.01)
(Continued)

(52) U.S. Cl.
CPC ......... *H04W 52/146* (2013.01); *H04W 52/10* (2013.01); *H04W 52/242* (2013.01); *H04W 52/36* (2013.01)

(58) Field of Classification Search
CPC . H04W 52/146; H04W 52/10; H04W 52/242; H04W 52/36; H04W 72/1268;
(Continued)

(56) References Cited

U.S. PATENT DOCUMENTS

| | | | | |
|---|---|---|---|---|
| 11,044,677 | B2 * | 6/2021 | Ryu .................... | H04W 52/242 |
| 2018/0310257 | A1 * | 10/2018 | Papasakellariou .... | H04W 52/08 |

(Continued)

FOREIGN PATENT DOCUMENTS

| | | |
|---|---|---|
| CN | 109151973 A | 1/2019 |
| CN | 109803362 A | 5/2019 |

(Continued)

OTHER PUBLICATIONS

Samsung., "Remaining Issues on UL Power Control," 3GPP TSG RAN WG1 Meeting 91, R1-1720361, pp. 1-14, (Dec. 1, 2017).

(Continued)

*Primary Examiner* — Lana N Le
(74) *Attorney, Agent, or Firm* — Price Heneveld LLP

(57) ABSTRACT

This application discloses a power control method and apparatus, and user equipment. The method includes: receiving, by UE, DCI, where the DCI is used to schedule PUSCH transmission; the PUSCH transmission is associated with different target resources; and the target resource includes: an SRS resource or an SRS resource group; and determining, based on the DCI, a target power control parameter corresponding to the PUSCH transmission. Embodiments of this application are applied to power adjustment scenarios.

20 Claims, 4 Drawing Sheets

(51) Int. Cl.
*H04W 52/24* (2009.01)
*H04W 52/36* (2009.01)

(58) Field of Classification Search
CPC ... H04W 52/325; H04W 52/08; H04W 52/06; H04W 52/54; H04W 72/231; H04W 72/232
See application file for complete search history.

(56) References Cited

U.S. PATENT DOCUMENTS

2019/0190747 A1 6/2019 Park et al.
2019/0335400 A1 10/2019 Gong et al.
2020/0205082 A1* 6/2020 Chen .................... H04W 52/54
2020/0351798 A1 11/2020 Ji et al.
2020/0404593 A1 12/2020 Yao et al.
2022/0369242 A1 11/2022 Matsumura et al.
2023/0024375 A1 1/2023 Yao et al.
2023/0084983 A1* 3/2023 Pan .................... H04W 72/232
2023/0370219 A1* 11/2023 Ling .................. H04W 52/146
2024/0114467 A1* 4/2024 Yuan .................... H04W 52/10

FOREIGN PATENT DOCUMENTS

CN 110621063 A 12/2019
CN 111092710 A 5/2020
CN 111867078 A 10/2020
JP 2020510383 A 4/2020
JP 2021503788 A 2/2021
WO 2019096317 A1 5/2019
WO 2020/118574 A1 6/2020
WO 2020150943 A1 7/2020
WO 2020255401 A1 12/2020

OTHER PUBLICATIONS

Huawei et al., "Independent Power control for SRS," 3GPP TSG RAN WG1 Meeting #92bis, R1-1804449, (Apr. 20, 2018).
Ericsson., "On pathloss reference RS MAC CE for SRS and PUSCH," 3GPP TSG-RAN WG2 #110e, R2-2004463, (Jun. 1-12, 2020).
International Search Report and Written Opinion of the International Searching Authority dated Apr. 13, 2022 as received in Application No. PCT/CN2022/071784.
CN Office Action dated Nov. 30, 2023 as received in Application No. 202110057780.3.
"3rd Generation Partnership Project; Technical Specification Group Radio Access Network; NR; Physical Layer Procedures for Control (Release 16)," 3GPP TS 38.213 V16.4.0, Dec. 2020.
"Enhancements on Multi-TRP for PDCCH, PUCCH and PUSCH," 3GPP TSG-RAN WG1 Meeting #103e, RQ-2009251, e-meeting, Oct. 26, Nov. 13, 2020, Qualcomm Incorporated.

* cited by examiner

POWER CONTROL METHOD AND APPARATUS, AND USER EQUIPMENT

CROSS-REFERENCE TO RELATED APPLICATIONS

This application is a continuation application of PCT Application No. PCT/CN2022/071784 filed on Jan. 13, 2022, which claims priority to Chinese Patent Application No. 202110057780.3, filed in China on Jan. 15, 2021, disclosures of which are incorporated herein by reference in their entireties.

TECHNICAL FIELD

This application relates to the field of communications technologies, and specifically, to a power control method and apparatus, and user equipment.

BACKGROUND

To support physical uplink shared channel (PUSCH) transmission over multiple transmission and reception points or panels (Multi-TRP/panel, MTRP), which means that PUSCH may switch to different panels for transmission through time division, in a case that single downlink control information (DCI) is continuously used to schedule PUSCH, the PUSCH transmission needs to be associated with a plurality of different sounding reference signal (SRS) resources in some scenarios, where different SRS resources is configured with different spatial relation information.

However, for the scenarios in which the PUSCH transmission is associated with a plurality of different SRS resources, an effective transmit power adjustment scheme has not yet been proposed.

SUMMARY

According to a first aspect, a power control method is provided and performed by user equipment (UE). The method includes: receiving DCI from a network-side device, where the DCI is used to schedule PUSCH transmission, the PUSCH transmission is associated with N different target resources, and the target resource includes an SRS resource or an SRS resource group; and determining, based on the DCI, a corresponding target power control parameter when the PUSCH transmission is associated with different target resources.

According to a second aspect, a power control apparatus is provided. The apparatus includes: a receiving module configured to receive DCI from a network-side device, where the DCI is used to schedule PUSCH transmission, the PUSCH transmission is associated with N different target resources, and the target resource includes an SRS resource or an SRS resource group; and a determining module, configured to determine, based on the DCI received by the receiving module, a corresponding target power control parameter when the PUSCH transmission is associated with different target resources.

According to a third aspect, UE is provided. The UE includes a processor, a memory, and a program or instructions stored in the memory and capable of running on the processor, where when the program or instructions are executed by the processor, the steps of the method according to the first aspect are implemented.

According to a fourth aspect, a readable storage medium is provided. The readable storage medium stores a program or instructions, and when the program or instructions are executed by a processor, the steps of the method according to the first aspect are implemented.

According to a fifth aspect, a chip is provided. The chip includes a processor and a communications interface. The communications interface is coupled to the processor, and the processor is configured to run a program or instructions on a network-side device so as to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates an "or" relationship between the associated objects.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described may be used in the above-mentioned systems and radio technologies as well as other systems and radio technologies. In the following descriptions, a new radio (New Radio, NR) system is described for an illustration purpose, and NR terms are used in most of the following descriptions, although these technologies may also be applied to other applications than an NR system application, for example, the 6th generation (6G) communications system.

Figure 1:
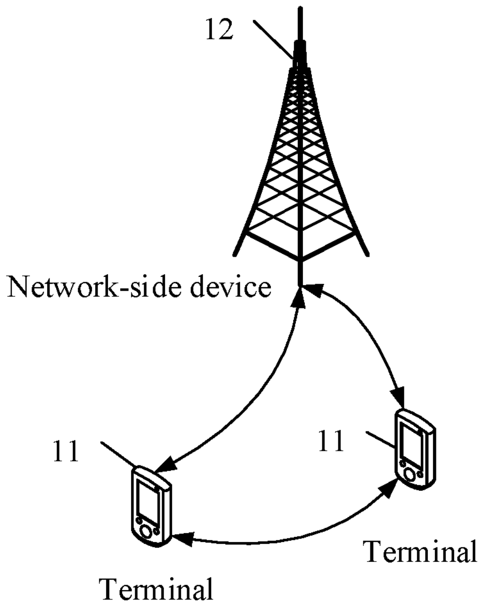
FIG. 1 is a schematic architectural diagram of a wireless communications system according to an embodiment of this application.

FIG. 1 is a schematic diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer also referred to as a notebook computer, a personal digital assistant (PDA), a palmtop computer, a netbook, an ultra-mobile personal computer (UMPC), a mobile Internet device (MID), a wearable device or a vehicle user equipment (VUE), or a pedestrian user equipment (PUE). The wearable device includes a wristband, earphones, glasses, and the like. It should be noted that a specific type of the terminal 11 is not limited in the embodiments of this application. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a WiFi node, a transmitting receiving point (Transmitting and Receiving Point, TRP), or another appropriate term in the art. Provided that the same technical effects are achieved, the base station is not limited to a specific technical term. It should be noted that the base station in the NR system is merely used as an example in the embodiments of this application, but a specific type of the base station is not limited.

For ease of understanding, the following describes uplink power control and adjustment processes.

UE transmit power in PUSCH transmission occasion i is $P_{PUSCH,b,f,c}(i,j,q_d,l)$: where $$P_{PUSCH,b,f,c}(i,j,q_d,l)=\min\left\{\begin{matrix}P_{CMAX,f,c}(i),\\ P_{O\_PUSCH,b,f,c}(j)+10\log_{10}\left(2^{\mu}\cdot M^{PUSCH}_{RB,b,f,c}(i)\right)+\alpha_{b,f,c}(j)\cdot PL_{b,f,c}(q_d)+\\ \Delta_{TF,b,f,c}(i)+f_{b,f,c}(i,l)\end{matrix}\right\}$$

b represents an active uplink BWP on which the PUSCH is located, f represents a PUSCH carrier in the BWP, and c represents a serving cell;

$P_{CMAX,f,c}(i)$ is a UE-configured maximum transmit power;

$P_{O\_PUSCH,b,f,c}(j)=P_{O\_NOMINAL\_PUSCH,f,c(j)}+P_{O\_UE\_PUSCH,b,f,c(j)}$, where $j\in\{0, 1, \ldots, J-1\}$, $P_{O\_NOMINAL\_PUSCH,f,c(j)}$ is configured by a network side, and $P_{O\_UE\_PUSCH,b,f,c(j)}$, that is, P0, is dynamically indicated by the network side;

$\alpha_{b,f,c}(j)$, that is a combination of α and P0, is dynamically indicated by the network side;

$PL_{b,f,c}(q_d)$ represents a downlink pathloss estimate calculated by using a pathloss-reference signal (PL-RS) with an index $q_d$; and $f_{b,f,c}(i,l)$ represents a closed-loop power control adjustment value corresponding to a power control adjustment state1.

It should be noted that the target power control parameter (such as α and P0) determined by the technical solution provided in the embodiments of this application can be applied to the power adjustment process described above for uplink power adjustment.

The following describes in detail the power control method provided in the embodiments of this application through specific embodiments and application scenarios thereof with reference to the accompanying drawings.

Figure 2:
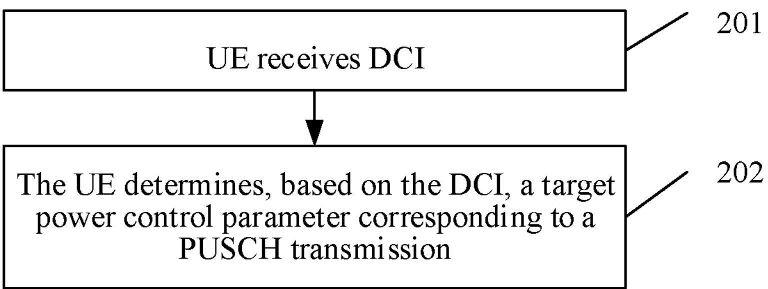
FIG. 2 is a flowchart of a power control method according to an embodiment of this application.

FIG. 2 is a schematic flowchart of a power control method according to an embodiment of the present invention. As shown in FIG. 2, the parameter adjusting method may include the following steps.

Step 201: UE receives DCI.

For example, the UE receives the DCI from a network-side device.

For example, the DCI is used to schedule PUSCH transmission; the PUSCH transmission is associated with different target resources; and the target resource includes an SRS resource or an SRS resource group.

Step 202: The UE determines, based on the DCI, a target power control parameter corresponding to the PUSCH transmission.

In this embodiment of this application, the target power control parameter includes at least one of the following:

open-loop power control parameter (such as, {P0, α}), parameter indicating a pathloss reference signal PL-RS, and closed-loop power control adjustment state index.

P0 and a are target received power and pathloss compensation factor, and the closed-loop power control adjustment state index is used to indicate a closed-loop power control adjustment state that an SRS can maintain.

Optionally, in this embodiment of this application, the DCI further includes a closed-loop power control adjustment state index and a power adjustment value corresponding to the closed-loop power control adjustment state index; where the target power control parameter includes the power adjustment value. For example, the closed-loop power control adjustment state index may be a plurality of closed-loop power control adjustment state indexes, and the plurality of closed-loop power control adjustment state indexes may take different values.

For example, a TPC field in the DCI is used to indicate the power adjustment value, and a size of the TPC field is indicated by higher-layer signaling. Further, the higher-layer signaling is RRC or a MAC CE. For example, when the UE receives a MAC CE, and all code points indicated by the MAC CE correspond to only one SRS resource or SRS resources corresponding to all code points indicated by the MAC CE belong to a same SRS resource set, a size of the TPC field is 2 bits; otherwise, the size of the TPC field is 4 bits.

Optionally, in this embodiment of this application, the target resource maintains a plurality of closed-loop power control adjustment states. The closed-loop power control adjustment state satisfies at least one of the following: the closed-loop power control adjustment state is indicated by higher-layer signaling; or the closed-loop power control adjustment state is associated with an SRS resource set; where the SRS resource set includes the target resource (that is, the SRS resource or SRS resource group associated with the PUSCH transmission).

For example, the UE receives high-layer signaling, and the high-layer signaling indicates to UE that there are a plurality of closed-loop power control adjustment states in the SRS resource or the SRS resource group.

For example, a closed-loop power control adjustment state index is included in a configuration of the SRS resource set.

In the power control method according to this embodiment of this application, in the scenario in which the PUSCH transmission is associated with N different target resources (SRS resource or SRS resource group), after receiving the DCI for scheduling the PUSCH transmission from a network-side device, the UE can determine, based on the DCI, a corresponding target power control parameter when the PUSCH transmission is associated with different target resources, and then can ensure that a plurality of sets of transmit powers matching a plurality of target resources are used for the PUSCH transmission, so as to guarantee the reliability of the PUSCH transmission.

The following further describes several solutions of the power control method according to this embodiment of this application.

In one optional solution, the target power control parameter includes a power control parameter in at least one set of first power control parameters. For example, a set of first power control parameters may be referred to as SRI-PUSCH power control parameter set (SRI-PUSCH-PowerControl). Further, the first power control parameter may contain at least one of the following parameters: target received power and pathloss compensation factor (such as P0 and $\alpha$), index of pathloss reference signal PL-RS, and closed-loop power control state index (such as, 1 in the above description).

Optionally, in this embodiment of this application, in a case that the DCI includes an SRI field, the SRI field is used to indicate at least one set of first power control parameters, where the target power control parameter includes a power control parameter in the at least one set of first power control parameters. In one example, the first power control parameter may be referred to as SRI-PUSCH-PowerControl.

Further optionally, in this embodiment of this application, after the foregoing step 201, the power control method according to this embodiment of this application may include the following step 201*a:*

Step 201*a*: UE determines at least one set of first power control parameters corresponding to at least one first sequence.

The first sequence is a sequence having a mapping relationship with a first value. The first value includes any one of the following: a field value of the SRI field and values obtained by respectively superimposing different first offset values on the field value of the SRI field.

The first offset value satisfies at least one of the following:

- the first offset value is configured by higher-layer signaling;
- the first offset value is an integer; or
- the first offset value is associated with an SRS resource set, the SRS resource set including at least one target resource.

For example, the at least one first sequence is associated with Y SRS resource sets; and one first sequence is associated with at least one SRS resource set, Y being a positive integer; where the Y SRS resource sets include different target resources associated with the PUSCH transmission.

For example, the field value of the SRI field in the DCI is mapped to one or more sets of sri-PUSCH mapped addition/modification sequences (sri-PUSCH-MappingToAddModList) (that is, the first sequence), so as to obtain one or more sets of first power control parameters (SRI-PUSCH-PowerControl). In an example, the sri-PUSCH-MappingToAddModList sequence is associated with an SRS resource set (the SRS resource set includes at least one SRS associated with the PUSCH).

For example, after superimposed with different first offset values (that is, first values), the field value of the SRI field is mapped to a set of sri-PUSCH-MappingToAddModList sequences respectively, so as to obtain one or more sets of SRI-PUSCH-PowerControl.

For example, the SRI field in the DCI corresponds to at least one field value, and there is a mapping relationship between one field value and one first sequence. For example, two SRI fields are included in the DCI, where one SRI field corresponds to one SRI value (that is, a field value of the SRI field), or the SRI fields of the DCI jointly indicate two SRI values. It can be understood that one or more SRI values indicated by the DCI are respectively mapped to a set of sri-PUSCH-MappingToAddModList sequences, so as to obtain one or more sets of SRI-PUSCH-PowerControls.

Further optionally, in this embodiment of this application, the at least one set of first power control parameters indicated by the SRI field contained in the DCI is associated with M target resources indicated by the SRI field, where M is a positive integer. The M target resources satisfy at least one of the following: The M target resources respectively belong to different SRS resource sets; or all SRS resources in an SRS resource group belong to a same SRS resource set.

For example, one or more sets of SRI-PUSCH-PowerControl indicated by the SRI field in the DCI are associated with one or more SRS resource/SRS resource groups indicated by the SRI field. For example, a plurality of SRS resources/SRS resource groups come from different SRS resource sets; and all SRS resources in one SRS resource group come from a same SRS resource set.

Optionally, in this embodiment of this application, in a case that the DCI contains no SRI field, before the foregoing step 202, the power adjustment method according to this embodiment of this application may include the following step:

Step 203: The UE determines at least one set of first power control parameters, and the target power control parameter is a power control parameter in the at least one set of first power control parameters.

Further optionally, in this embodiment of this application, the at least one set of first power control parameters include an open-loop power control parameter. The foregoing step 203 may include the following step 203*a:*

Step 203*a*: The UE determines a target open-loop power control parameter group from a power control parameter set configured by higher-layer signaling. The power control parameter set includes one or more groups of open-loop power control parameters; the target open-loop power control parameter group belongs to the power control parameter set; the target open-loop control parameter group includes at least one set of first power control parameters; and the target power control parameter is a power control parameter in the at least one set of first power control parameters.

For example, one target open-loop control parameter group includes: target received power P0 and pathloss compensation factor; or, one or more target received powers P0. It should be noted that one target open-loop control parameter group may contain one P0 or two P0.

For example, when the DCI contains no SRI field, open-loop power control parameters of the one or more sets of first power parameter may be obtained from one or more sets of open-loop power control parameters (such as P0-PUSCH-AlphaSet) in the power control parameter set (such as P0-AlphaSets).

For example, the target open-loop power control parameter group satisfies at least one of the following:

a position of the target open-loop power control parameter group in the power control parameter set is determined based on a second offset value; or the target open-loop power control parameter group is an open-loop power control parameter group corresponding to a group index satisfying a first condition in the power control parameter set.

The second offset value satisfies at least one of the following:

the second offset value is configured by higher-layer signaling;

the second offset value is an integer; or the second offset value is associated with an SRS resource set, the SRS resource set including at least one target resource.

For example, positions of the one or more sets of P0-PUSCH-AlphaSets in a p0-AlphaSets set may be 1, 1+offset1, 1+offset2, and the like, respectively. The offset1, offset2, . . . , offset K are configured by higher-layer signaling and associated with an SRS resource set.

Further optionally, in this embodiment of this application, the at least one set of first power control parameters includes a parameter indicating at least one set of pathloss reference signals. A parameter for the at least one set of pathloss reference signals is determined based on at least one of the following:

an index of a pathloss reference signal configured by a physical uplink control channel (PUCCH) resource;

one or more sets of pathloss reference signals indicated by a plurality of consecutive indexes starting from a first preset index (for example, index 0); or reference signals in transmission configuration indicator (TCI) states of a plurality of CORESETs indicated by a plurality of consecutive indexes starting from a second preset index (for example, a lowest index and a specific index).

In one optional solution, the target power control parameter includes at least one of the following: a power control parameter in the at least one set of first power control parameters or a power control parameter in the at least one set of second power control parameters. For example, a set of first power control parameters may be referred to as SRI-PUSCH-PowerControl; and a set of second power control parameters may be referred to as a PUSCH target received power set (P0-PUSCH-Set-r16), the P0-PUSCH-Set-r16 including the target received power P0.

Optionally, in this embodiment of this application, after the foregoing step 202, the power control method according to this embodiment of this application may include the following step 204:

Step 204: The UE determines at least one set of second power control parameters in a plurality of sets of second power control parameters configured by higher-layer signaling.

Further optionally, in this embodiment of this application, in a case that the DCI contains no SRI field, one set of second power control parameters includes at least two second power control parameters.

Further optionally, in this embodiment of this application, one set of second power control parameters corresponds to one index; and the at least one set of second power control parameters is at least one set of second power control parameters corresponding to a target index in the plurality of sets of second power control parameters; where the target index is obtained based on a third offset value on the basis of a preset index.

For example, the third offset value satisfies at least one of the following:

the third offset value is configured by higher-layer signaling;

the third offset value is an integer; or the third offset value is associated with an SRS resource set, the SRS resource set including at least one target resource.

For example, the one or more sets of P0-PUSCH-Set-r16 may be P0-PUSCH-Set-r16 corresponding to indexes such as index a, index (a+offset1), index (a+offset2), . . . , and index (a+offsetH). The offset1, offset2, . . . , offsetH are configured by higher-layer signaling and associated with an SRS resource set. In an example, the index a may be the smallest index.

Further optionally, in this embodiment of this application, the target power control parameter includes a target third power control parameter (such as, the target received power P0). The foregoing step 202 may include the following step 202*b:*

Step 202*b*: In a case that the at least one set of first power control parameters and the at least one set of second power control parameters both include a third power control parameter, the UE determines, based on a field value of an open-loop power control parameter set indication field in the DCI, the target third power control parameter from the at least one set of first power control parameters and the at least one set of second power control parameters.

For example, the open-loop power control parameter set indication field may be referred to as an OLPC (Open-loop power control parameter set indication) field. It can be understood that the OLPC field and the SRI field in the DCI jointly indicate at least one set of second power control parameters for the UE. For example, the UE receives high-level signaling and obtains that the bit size of OLPC fields of DCI format 0_1 and DCI format 0_2 for scheduling the PUSCH is 1 bit or 2 bits.

For example, the OLPC field is used to indicate a source of the target third power control parameter (that is, P0).

For example, in a case that the open-loop power control parameter set indication field contains 1 significant bit, the field value of the OLPC field is used to indicate whether the target third power control parameter comes from the at least one set of first power control parameters or from the at least one set of second power control parameters.

Example 1: For a scenario in which the OLPC field is 1 significant bit (that is, 1 bit). When the OLPC field takes "0", it means that one or more sets of P0 for PUSCH transmission respectively take P0 in one or more SRI-PUSCH-PowerControls indicated by the SRI field; or, when the OLPC field takes "1", it means that one or more sets of P0 for PUSCH transmission respectively take P0 in one or more sets of P0-PUSCH-Set-r16 indicated by the SRI field.

For example, in a case that the open-loop power control parameter set indication field contains X significant bits, each group of significant bits of the open-loop power control parameter set indication field corresponds to one target resource, where the X significant bits includes at least one group of significant bits, X being an integer greater than 1. Further, a value of any one group of significant bits of the open-loop power control parameter set indication field is used to indicate: a target third power control parameter associated with a target resource corresponding to the any one group of significant bits.

Example 2: In a case that the DCI contains an SRI field, for a scenario in which an OLPC field contains 2 significant bits. Assuming that the most significant bit is associated with the first SRS resource and the least significant bit is associated with the second SRS resource, a source of P0 is indicated in a manner as shown in Table 1 below.

TABLE 1

| | MSB (most significant bit) | LSB (least significant bit) |
|---|---|---|
| 0 | The power control parameter P0 in SRI-PUSCH-PowerControl is used as P0 corresponding to a PUSCH transmission occasion associated with the first SRS resource. | The power control parameter P0 in SRI-PUSCH-PowerControl is used as P0 corresponding to a PUSCH transmission occasion associated with the second SRS resource. |
| 1 | The power control parameter P0 in P0-PUSCH-Set-r16 is used as P0 corresponding to a PUSCH transmission occasion associated with the first SRS resource. | The power control parameter P0 in P0-PUSCH-Set-r16 is used as P0 corresponding to a PUSCH transmission occasion associated with the second SRS resource. |

It should be noted that when the SRI field only indicates one SRS resource or one SRS resource group, the OLPC field is used to indicate a source of P0 of significant bits corresponding to the SRS resource or SRS resource group.

Example 3: In a case that the DCI contains no SRI field, for a scenario in which an OLPC field contains 4 significant bits. Assuming that the first two significant bits are associated with the first SRS resource, the last two significant bits are associated with the second SRS resource, and each set of second power control parameters contains two second power control parameters (that is, P0-1 and P0-2), a source of P0 is indicated in a manner as shown in Table 2 below.

TABLE 2

| | First two bits | Last two bits |
|---|---|---|
| 00 | P0 in at least one set of first power control parameters PUSCH associated with the first SRS resource/group | P0 in at least one set of first power control parameters is used for PUSCH associated with the second SRS resource/group |
| 01 | P0-1 in at least one set of second power control parameters is used for PUSCH associated with the first SRS resource/group | P0-1 in at least one set of second power control parameters is used for PUSCH associated with the second SRS resource/group |
| 10 | P0-2 in at least one set of second power control parameters is used for PUSCH associated with the first SRS resource/group | P0-2 in at least one set of second power control parameters is used for PUSCH associated with the second SRS resource/group |

Further optionally, in this embodiment of this application, the foregoing step 204 may include the following step 204*a*:

Step 204*a*: In a case that the DCI contains the SRI field, the UE determines at least one set of second power control parameters corresponding to at least one second sequence based on a sequence configuration of the at least one second sequence contained in higher-layer signaling.

The second sequence is a sequence having a mapping relationship with a second value. The second value includes any one of the following: a field value of the SRI field contained in the DCI and values obtained by respectively superimposing different fourth offset values on the field value of the SRI field contained in the DCI.

For example, the fourth offset value satisfies at least one of the following:

the fourth offset value is configured by higher-layer signaling;

the fourth offset value is an integer; or the fourth offset value is associated with an SRS resource set, the SRS resource set including at least one target resource.

For example, the SRI field contained in the DCI corresponds to at least one field value, and there is a mapping relationship between one field value and at least one second sequence.

For example, the second sequence may be referred to as P0-PUSCH-SetList-r16. In an example, the UE receives higher-layer signaling and obtains a sequence configuration for one or more sets of P0-PUSCH-SetList-r16. The sequence configuration is used to indicate that the one or more sets of P0-PUSCH-SetList-r16 are associated with a plurality of SRS resource sets respectively. Each set of P0-PUSCH-SetList-r16 contains a plurality of sets of P0-PUSCH-Set-r16, and each set of P0-PUSCH-Set-r16 contains one P0-PUSCH-r16 (P0).

For example, the SRI fields in the DCI may be respectively mapped to different P0-PUSCH-SetList-r16, so as to obtain a plurality of sets of P0-PUSCH-Set-r16.

For example, the UE receives higher-level signaling, obtains a set of P0-PUSCH-SetList-r16 configurations, and obtains a plurality of fourth offset values. After superimposed with different fourth offset values respectively, SRI values in the SRI field are respectively mapped to a set of P0-PUSCH-SetList-r16, so that a plurality of sets of P0-PUSCH-Set-r16 are obtained.

Example 4

First, the UE receives higher-level signaling. The higher-level signaling configures two SRS resource sets for codebook transmission. There are two sri-PUSCH-MappingToAddModLists associated with the two SRS resource sets, and two P0-PUSCH-SetList-r16 is associated with the SRS resource set. In addition, the UE receives DCI for scheduling PUSCH transmission, and an SRI field of the DCI indicates that two SRS resources from different SRS resource sets are used for the PUSCH transmission. In this case, a value of the SRI field of the DCI is respectively mapped to two sri-PUSCH-MappingToAddModLists to obtain two SRI-PUSCH-PowerControls (containing P0_a and P0_b respectively) associated with the two SRS resources. Then, the value of the SRI field of the DCI is respectively mapped to two P0-PUSCH-SetList-r16 to obtain two P0-PUSCH-Set-r16 (containing P0_c and P0_d respectively) associated with the two SRS resources.

Next, when the higher-layer signaling configures that a size of the OLPC field is 1 bit, '0' indicates that the two P0 of the two sets of power control parameters are respectively equal to the P0_a and P0_b in the two SRI-PUSCH-PowerControls, and '1' indicates that the two P0 of the two sets of power control parameters take the P0_c and P0_d in the two P0-PUSCH-SetList-r16.

When the higher-layer signaling configures that the size of the OLPC field is 2 bits, the most significant bit is associated with the first SRS resource, and the least significant bit is associated with the second SRS resource, values of the OLPC field are shown in Table 3 below.

TABLE 3

| | MSB | LSB |
|---|---|---|
| 0 | The power control parameter P0 (that is, P0_a) in SRI-PUSCH-PowerControl is used as P0 corresponding to a PUSCH transmission occasion associated with the first SRS resource. | The power control parameter P0 (that is, P0_b) in SRI-PUSCH-PowerControl is used as P0 corresponding to a PUSCH transmission occasion associated with the second SRS resource. |
| 1 | The power control parameter P0 (that is, P0_c) in P0-PUSCH-Set-r16 is used as P0 corresponding to a PUSCH transmission occasion associated with the first SRS resource. | The power control parameter P0 (that is, P0_d) in P0-PUSCH-Set-r16 is used as P0 corresponding to a PUSCH transmission occasion associated with the second SRS resource. |

In one optional solution, at least one piece of time-frequency resource information for the PUSCH transmission corresponds to at least one set of power control parameters.

The time-frequency resource information is used to indicate any one of the following:

at least one transmission occasion of the PUSCH;

a time-frequency resource for each frequency hopping of the PUSCH; and a plurality of time-domain resources in a first transmission occasion of the PUSCH, one time-domain resource including a plurality of consecutive orthogonal frequency division multiplexing (OFDM) symbols.

The first transmission occasion is one of the at least one transmission occasion, and the target power control parameter includes a power control parameter in the at least one set of power control parameters. It should be noted that the power control parameters may be a power control parameter in the at least one set of first power control parameters, or may be a power control parameter in the at least one set of second power control parameters. This is not limited in this embodiment of this application.

For example, the at least one transmission occasion may be at least one retransmission occasion of the PUSCH. Specifically, a set of power control parameters is used to calculate the transmit power for a retransmission occasion of the PUSCH. The retransmission occasion and the power control parameter are associated with a same SRS resource or SRS resource group.

Further optionally, in this embodiment of this application, after the foregoing step 202, the power control method according to this embodiment of this application may further include the following steps 205*a* and 205*b*:

Step 205*a*: The UE performs K times of frequency hopping for the PUSCH, where each frequency hopping of the PUSCH corresponds to a set of power control parameters, and K is an integer greater than or equal to 1; and Step 205*b*: The UE adjusts the transmit power for the PUSCH according to a power control parameter corresponding to each frequency hopping during each frequency hopping of the PUSCH.

Further optionally, in this embodiment of this application, each frequency hopping of the PUSCH satisfies any one of the following:

different frequency hopping points corresponding to transmission occasions for the PUSCH are associated with different target resources; or each frequency hopping point and corresponding power control parameters of the frequency hopping point are associated with same target resources.

For example, a set of power control parameters are used for one hop (frequency hopping) of the PUSCH to calculate the transmit power (that is, PUSCH power adjustment is performed based on one hop). Different hops corresponding to the PUSCH transmission occasions are associated with different SRS resources or SRS resource groups. Alternatively, a hop of the PUSCH and the power control parameter corresponding to the hop are associated with a same SRS resource or SRS resource group.

Further optionally, in this embodiment of this application, one transmission occasion corresponds to at least one set of power control parameters.

Further optionally, in this embodiment of this application, in a case that the first transmission occasion corresponds to at least two sets of power control parameters, each of the time-domain resources in the first transmission occasion corresponds to one set of power control parameters. In an example, target resources associated with the plurality of consecutive OFDM symbols are the same; or target resources associated with the plurality of consecutive OFDM symbols are the same target resources associated with power control parameters corresponding to the plurality of consecutive OFDM symbols.

For example, when the number of repetitions of the PUSCH is 1, at least one set of first power control parameters or at least one set of second power control parameters indicated by the SRI field is used in the PUSCH repetition occasion.

For example, a set of power control parameters may be used to calculate the transmit power for a plurality of consecutive OFDM symbols in one transmission occasion of the PUSCH (that is, the power adjustment may be performed based on a plurality of consecutive OFDM symbols with the same spatial relationship). It should be noted that the consecutive OFDM symbols are associated with a same SRS resource or SRS resource group (that is, a transmit beam is the same), and that the consecutive OFDM symbols and the power control parameters corresponding to the consecutive OFDM symbols are associated with the same SRS resource or SRS resource group.

In an example, when the number of PUSCH retransmissions is 1, if a plurality of sets of power control parameters are used in the transmission occasion of the PUSCH, one set of power control parameters is used for the first half of OFDM symbols, and another set of power control parameters is used for the second half of OFDM symbols.

For example, when the number of PUSCH retransmissions is 1, if a code point indicated by the SRI of the DCI that schedules the PUSCH is associated with two SRS resources belonging to different SRS resource sets, the first N/2 symbols in the transmission occasion of the PUSCH use the same spatial relationship as the first SRS resource in the code point for transmission, and the remaining N−N/2 symbols use the same spatial relationship as the second SRS resource in the code point for transmission. In this case, the SRI field is mapped to two sri-PUSCH-MappingToAddModLists to obtain two sets of power control parameter SRI-PUSCH-PowerControls. The transmit power used for the first N/2 symbols in the transmission occasion of the PUSCH is calculated by using the power control parameter mapped on the PUSCH-MappingToAddModList associated with the first SRS resource set, and the transmit power used for the remaining N−N/2 t symbols is calculated by using the power control parameter mapped on the PUSCH-MappingToAddModList associated with the second SRS resource set.

For example, when the number of PUSCH retransmissions is greater than 1, a set of power control parameters is used in one transmission occasion of the PUSCH.

It should be noted that the power control method provided in this embodiment of this application may be performed by a power control apparatus or a control module for performing the power control method in the power control apparatus. This embodiment of this application describes the power control apparatus provided in the embodiment of this application by using an example in which the power control apparatus performs the power control method. However, in practical applications, the foregoing power control method may also be performed by other devices or apparatuses capable of performing the power control method. This is not limited in this embodiment of this application.

Figure 3:
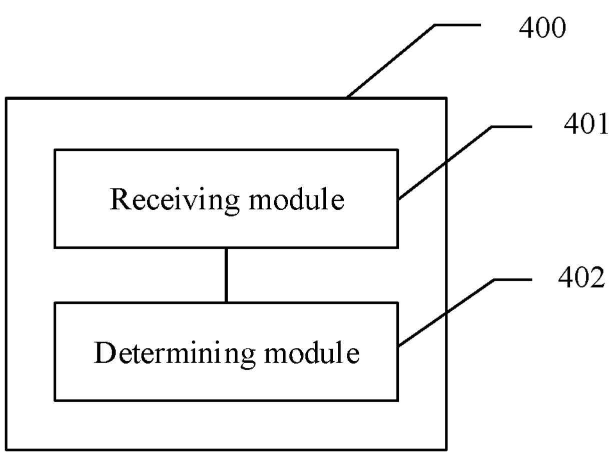
FIG. 3 is a first schematic structural diagram of a power control apparatus according to an embodiment of this application.
Figure 4:
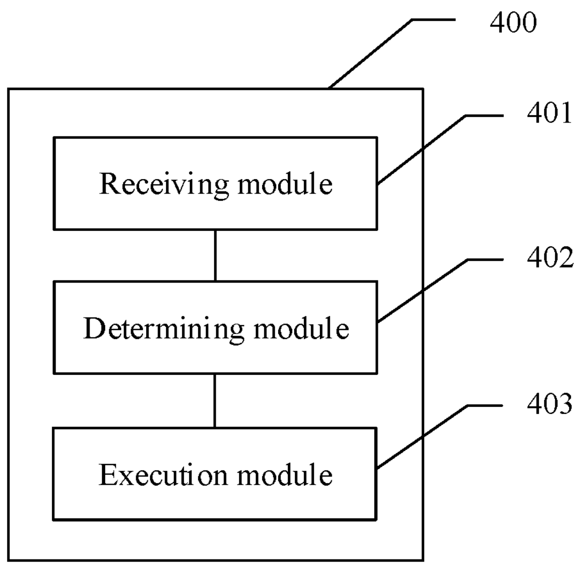
FIG. 4 is a second schematic structural diagram of a power control apparatus according to an embodiment of this application.

An embodiment of this application provides a power control apparatus. As shown in FIG. 3 and FIG. 4, the power control apparatus 400 includes a receiving module 401 and a determining module 402, where the receiving module 401 is configured to receive DCI, where the DCI is used to schedule PUSCH transmission, the PUSCH transmission is associated with different target resources, and the target resource includes: an SRS resource or an SRS resource group; and the determining module 402 is configured to determine, based on the DCI received by the receiving module, a target power control parameter corresponding to the PUSCH transmission.

Optionally, in a case that the DCI includes a reference signal resource indicator SRI field, the SRI field is used to indicate at least one set of first power control parameters, where the target power control parameter includes a power control parameter indicated by the SRI field.

Optionally, the determining module 402 is further configured to determine at least one set of first power control parameters corresponding to at least one first sequence, where the first sequence is a sequence having a mapping relationship with a first value.

The first value includes any one of the following: a field value of the SRI field and values obtained by respectively superimposing different first offset values on the field value of the SRI field.

The first offset value satisfies at least one of the following:

the first offset value is configured by higher-layer signaling;

the first offset value is an integer; or the first offset value is associated with an SRS resource set, the SRS resource set including at least one target resource.

Optionally, the at least one first sequence is associated with Y SRS resource sets; and one first sequence is associated with at least one SRS resource set, Y being a positive integer; where the Y SRS resource sets include the target resource.

Optionally, the SRI field corresponds to at least one field value, and there is a mapping relationship between one field value and one first sequence.

Optionally, the determining module 402 is further configured to: in a case that the DCI contains no SRI field, determine a target open-loop power control parameter group from a power control parameter set configured by higher-layer signaling, where the power control parameter set includes one or more open-loop power control parameter groups; the target open-loop power control parameter group belongs to the power control parameter set; the target open-loop control parameter group includes at least one set of first power control parameters; and the target power control parameter is a power control parameter in the at least one set of first power control parameters.

Optionally, the target open-loop power control parameter group satisfies at least one of the following:

a position of the target open-loop power control parameter group in the power control parameter set is determined based on a second offset value; or the target open-loop power control parameter group is an open-loop power control parameter group corresponding to a group index satisfying a first condition in the power control parameter set.

The second offset value satisfies at least one of the following:

the second offset value is configured by higher-layer signaling;

the second offset value is an integer; or the second offset value is associated with an SRS resource set, the SRS resource set including at least one target resource.

Optionally, the at least one set of first power control parameters includes a parameter indicating at least one set of pathloss reference signals.

The at least one set of pathloss reference signals is determined based on at least one of the following:

an index of a pathloss reference signal configured by a physical uplink control channel PUCCH resource;

one or more sets of pathloss reference signals indicated by a plurality of consecutive indexes starting from a first preset index; or reference signals in TCI states of a plurality of CORESETs indicated by a plurality of consecutive indexes starting from a second preset index.

Optionally, the determining module 402 is further configured to determine at least one set of second power control parameters in a plurality of sets of second power control parameters configured by higher-layer signaling.

The target power control parameter includes at least one of the following:

a power control parameter in the at least one set of first power control parameters; or a power control parameter in the at least one set of second power control parameters.

Optionally, in a case that the DCI contains no SRI field, one set of second power control parameters includes at least two second power control parameters.

Optionally, one set of second power control parameters corresponds to one index; and the at least one set of second power control parameters is at least one set of second power control parameters corresponding to a target index in the plurality of sets of second power control parameters.

The target index is obtained based on a third offset value on the basis of a preset index.

The third offset value satisfies at least one of the following:

the third offset value is configured by higher-layer signaling;

the third offset value is an integer; or the third offset value is associated with an SRS resource set, the SRS resource set including at least one target resource.

Optionally, the target power control parameter includes a target third power control parameter. The determining module 402 is specifically configured to: in a case that the at least one set of first power control parameters and the at least one set of second power control parameters both include a third power control parameter, determine, based on a field value of an open-loop power control parameter set indication field in the DCI, the target third power control parameter from the at least one set of first power control parameters and the at least one set of second power control parameters.

Optionally, in a case that the open-loop power control parameter set indication field contains X significant bits, each group of significant bits of the open-loop power control parameter set indication field corresponds to one target resource, where X is an integer greater than 1.

Optionally, a value of any one group of significant bits of the open-loop power control parameter set indication field is used to indicate: a target third power control parameter associated with a target resource corresponding to the any one group of significant bits.

Optionally, the determining module 402 is specifically configured to: in a case that the DCI contains the SRI field, determine at least one set of second power control parameters corresponding to at least one second sequence based on a sequence configuration of the at least one second sequence contained in higher-layer signaling, where the second sequence is a sequence having mapping relationship with a second value.

The second value includes any one of the following: a field value of the SRI field and values obtained by respectively superimposing different fourth offset values on the field value of the SRI field.

The fourth offset value satisfies at least one of the following:

- the fourth offset value is configured by higher-layer signaling;
- the fourth offset value is an integer; or
- the fourth offset value is associated with an SRS resource set, the SRS resource set including at least one target resource.

Optionally, the SRI field corresponds to at least one field value, and there is a mapping relationship between one field value and at least one second sequence.

Optionally, the at least one set of first power control parameters indicated by the SRI field is associated with M target resources indicated by the SRI field, where M is a positive integer.

Optionally, the M target resources satisfy at least one of the following:

- the M target resources respectively belong to different SRS resource sets; or
- all SRS resources in an SRS resource group belong to a same SRS resource set.

Optionally, at least one piece of time-frequency resource information for the PUSCH transmission corresponds to at least one set of power control parameters.

The time-frequency resource information is used to indicate any one of the following:

- at least one transmission occasion of the PUSCH;
- a time-frequency resource for each frequency hopping of the PUSCH; and
- a plurality of time-domain resources in a first transmission occasion of the PUSCH, one time-domain resource including a plurality of consecutive orthogonal frequency division multiplexing OFDM symbols; where
- the first transmission occasion is one of the at least one transmission occasion; and
- the target power control parameter includes a power control parameter in the at least one set of power control parameters.

Optionally, as shown in FIG. 4, the power control apparatus 400 further includes an execution module 403. The execution module 403 is configured to: perform K times of frequency hopping for the PUSCH, where each frequency hopping of the PUSCH corresponds to a set of power control parameters, and K is an integer greater than or equal to 1; and adjust transmit power for the PUSCH according to a power control parameter corresponding to each frequency hopping during each frequency hopping of the PUSCH.

Optionally, each frequency hopping of the PUSCH satisfies any one of the following:

- different frequency hopping points corresponding to transmission occasions for the PUSCH are associated with different target resources; or
- each frequency hopping point and corresponding power control parameters of the frequency hopping point are associated with same target resources.

Optionally, one transmission occasion corresponds to at least one set of power control parameters.

Optionally, in this embodiment of this application, in a case that the first transmission occasion corresponds to at least two sets of power control parameters, each of the time-domain resources in the first transmission occasion corresponds to one set of power control parameters.

Optionally, target resources associated with the plurality of consecutive OFDM symbols are the same; or target resources associated with the plurality of consecutive OFDM symbols are the same target resources associated with power control parameters corresponding to the plurality of consecutive OFDM symbols.

Optionally, the DCI further includes a closed-loop power control adjustment state index and a power adjustment value corresponding to the closed-loop power control adjustment state index; where the target power control parameter includes the power adjustment value.

Optionally, a TPC field in the DCI is used to indicate the power adjustment value, and a size of the TPC field is indicated by higher-layer signaling.

Optionally, the target resource maintains a plurality of closed-loop power control adjustment states. The closed-loop power control adjustment state satisfies at least one of the following: the closed-loop power control adjustment state is indicated by higher-layer signaling; or the closed-loop power control adjustment state is associated with an SRS resource set; where the SRS resource set includes the target resource.

In the power control apparatus according to this embodiment of this application, in scenarios in which the PUSCH transmission is associated with different target resources (SRS resource or SRS resource group), after receiving the DCI for scheduling the PUSCH transmission, the apparatus may determine, based on the DCI, a corresponding target power control parameter when the PUSCH transmission is associated with different target resources, and then can ensure that a plurality of sets of transmit powers matching a plurality of target resources are used for the PUSCH transmission, so as to guarantee the reliability of the PUSCH transmission.

For beneficial effects of the various implementations in this embodiment, reference may be made to the beneficial effects of the corresponding implementations in the foregoing method embodiment. To avoid repetition, details are not repeated herein.

The power control apparatus in this embodiment of this application may be an apparatus, or may be a component, an integrated circuit, or a chip in a terminal. The apparatus may be a mobile terminal or a non-mobile terminal. For example, the mobile terminal may include but is not limited to the foregoing illustrated types of terminals 11. The non-mobile terminal may be a server, a network attached storage (NAS), a personal computer (PC), a television (TV), a teller machine, a self-service machine, or the like. This is not specifically limited in the embodiments of this application.

The power control apparatus in this embodiment of this application may be an apparatus with an operating system. The operating system may be an Android operating system, may be an iOS operating system, or may be another possible operating system. This is not specifically limited in this embodiment of this application.

The power control apparatus according to this embodiment of this application can implement the processes of the foregoing method embodiment, with the same technical effects achieved. To avoid repetition, details are not described herein again.

Figure 5:
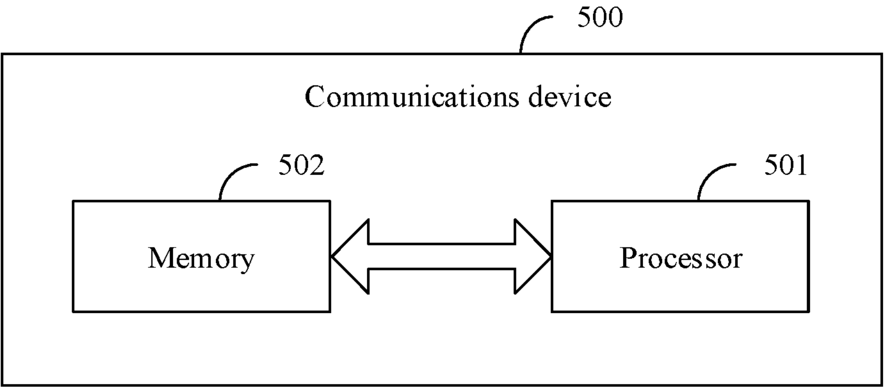
FIG. 5 is a schematic structural diagram of a communications device according to an embodiment of this application.

Optionally, as shown in FIG. 5, an embodiment of this application further provides a communications device 500, including a processor 501, a memory 502, and a program or instructions stored in the memory 502 and capable of running on the processor 501. For example, when the communications device 500 is UE, the program or the instructions are executed by the processor 501 to implement the processes of the foregoing embodiments of the power control methods, with the same technical effects achieved.

Figure 6:
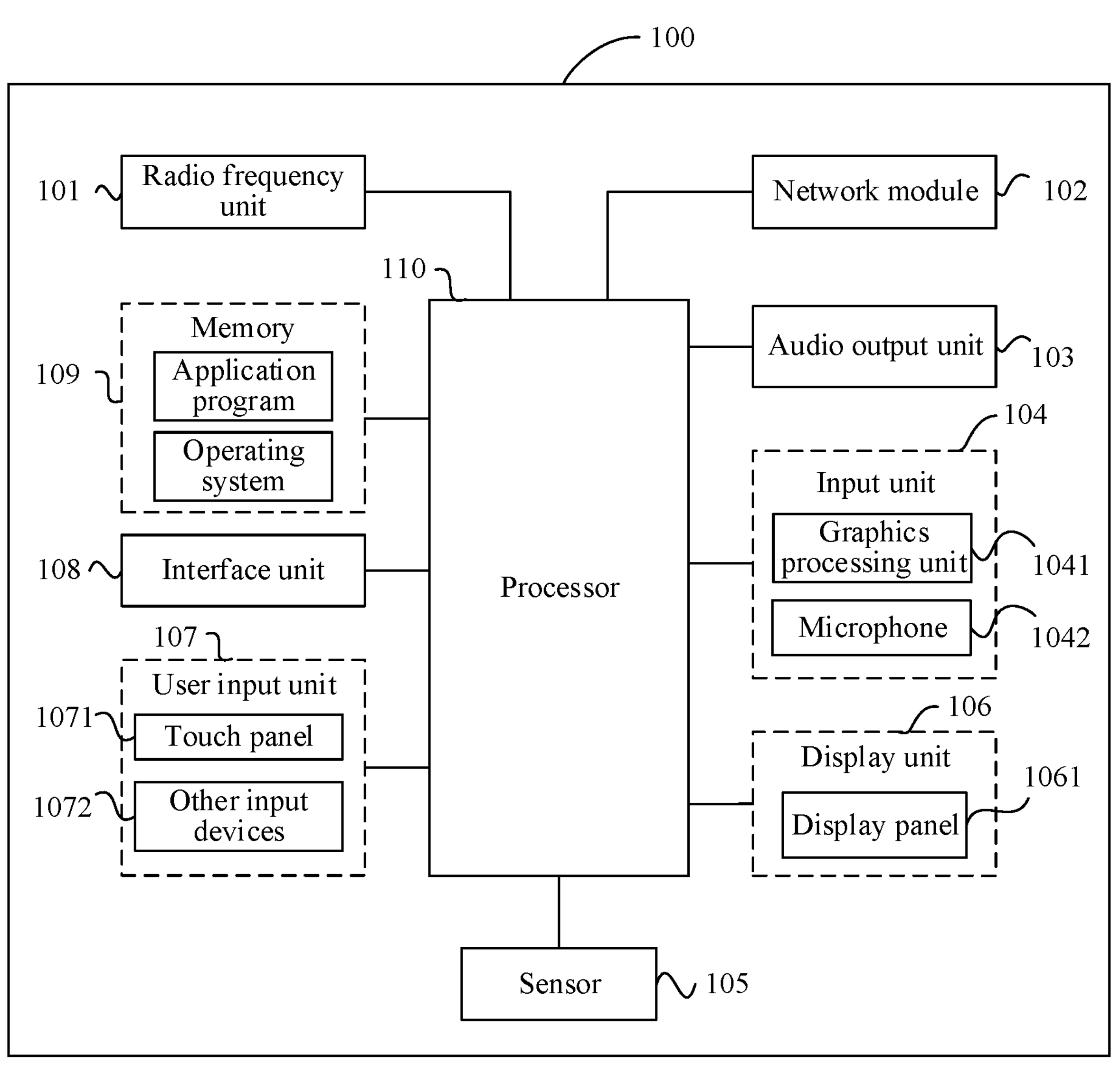
FIG. 6 is a schematic diagram of a hardware structure of UE according to an embodiment of this application.

With UE as an example of a terminal, FIG. 6 is a schematic diagram of a hardware structure of a terminal implementing an embodiment of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

Persons skilled in the art can understand that the terminal 100 may further include a power supply (such as a battery) for supplying power to the components. The power supply may be logically connected to the processor 110 through a power management system. In this way, functions such as charge management, discharge management, and power consumption management are implemented by using the power management system. The structure of the terminal shown in FIG. 6 does not constitute any limitation on the terminal. The terminal may include more or fewer components than shown in the figure, or combine some of the components, or arrange the components differently. Details are not described herein again.

The radio frequency unit 101 is configured to receive DCI, where the DCI is used to schedule PUSCH transmission, the PUSCH transmission is associated with different target resources, and the target resource includes: an SRS resource or an SRS resource group; and the processor 110 is configured to determine, based on the DCI received by the radio frequency unit 101, a target power control parameter corresponding to the PUSCH transmission.

In the terminal according to this embodiment of this application, in scenarios in which the PUSCH transmission is associated with different target resources (SRS resource or SRS resource group), after receiving the DCI for scheduling the PUSCH transmission, the terminal may determine, based on the DCI, a corresponding target power control parameter when the PUSCH transmission is associated with different target resources, and then can ensure that a plurality of sets of transmit powers matching a plurality of target resources are used for the PUSCH transmission, so as to guarantee the reliability of the PUSCH transmission.

For various implementations and beneficial effects of the various implementations in this embodiment, reference may be made to the content of the corresponding implementations in the foregoing method embodiment. To avoid repetition, details are not repeated herein.

It should be understood that in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in an image capture mode or a video capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function button (for example, a volume control button or a power button), a trackball, a mouse, and a joystick. Details are not described herein.

In this embodiment of this application, the radio frequency unit 101 sends downlink data received from a network-side device to the processor 110 for processing, and in addition, sends uplink data to the network-side device. Typically, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may mainly include a program or instruction storage area and a data storage area. The program or instruction storage area may store an operating system, an application program or instruction required by at least one function (for example, a sound play function and an image play function), and the like. In addition, the memory 109 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or other non-volatile solid-state storage devices.

The processor 110 may include one or more processing units. Optionally, the processor 110 may integrate an application processor and a modem processor. The application processor mainly processes an operating system, a user interface, application programs or instructions, and the like. The modem processor mainly processes wireless communication, for example, being a baseband processor. It can be understood that the modem processor may be alternatively not integrated in the processor 110.

An embodiment of this application further provides a readable storage medium, where the readable storage medium stores a program or instructions, and when the program or instructions are executed by a processor, the processes of the foregoing embodiment of the power control method are implemented, with the same technical effects achieved. To avoid repetition, details are not described herein again.

The processor is the processor of the terminal in the foregoing embodiment. The readable storage medium includes a computer-readable storage medium such as a read-only memory (ROM), a random access memory (RAM), a magnetic disk, an optical disc, or the like.

An embodiment of this application further provides a chip. The chip includes a processor and a communications interface, where the communications interface is coupled to the processor, and the processor is configured to run a program or instructions for a network-side device, to implement the processes of the foregoing embodiment of the power control method, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. In addition, it should be noted that the scope of the methods and apparatuses in the embodiments of this application is not limited to performing functions in the order shown or discussed, but may further include performing functions at substantially the same time or in reverse order depending on the involved functions. For example, the described method may be performed in an order different from the described order, and steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in each embodiment of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A power adjustment method, wherein the method comprises:

receiving, by user equipment (UE), downlink control information (DCI), wherein the DCI is used to schedule physical uplink shared channel (PUSCH) transmission; the PUSCH transmission is associated with different target resources; and the target resource comprises a plurality of sounding reference signal (SRS) resources, wherein the plurality of SRS resources come from different SRS resource sets;

determining at least one set of first power control parameters in a case that the DCI contains no SRS resource indicator SRI field, the at least one set of first power control parameters comprises a parameter indicating at least one set of pathloss reference signals, the at least one set of pathloss reference signals is determined based on multiple sets of pathloss reference signals indicated by a plurality of consecutive indexes starting from a first preset index; and determining, based on the DCI, a target power control parameter corresponding to the PUSCH transmission, wherein the target power control parameter is a power control parameter in the at least one set of first power control parameters.

2. The method according to claim 1, wherein in a case that the DCI contains no SRI field, before the determining, based on the DCI, a target power control parameter corresponding to the PUSCH transmission, the method further comprises:

determining a target open-loop power control parameter group from a power control parameter set configured by higher-layer signaling; wherein the power control parameter set comprises one or more open-loop power control parameter groups; the target open-loop power control parameter group belongs to the power control parameter set; the target open-loop control parameter group comprises at least one set of first power control parameters; and the target power control parameter is a power control parameter in the at least one set of first power control parameters.

3. The method according to claim 2, wherein the target open-loop power control parameter group satisfies at least one of the following:

a position of the target open-loop power control parameter group in the power control parameter set is determined based on a second offset value; or the target open-loop power control parameter group is an open-loop power control parameter group corresponding to a group index satisfying a first condition in the power control parameter set; wherein the second offset value satisfies at least one of the following:

the second offset value is configured by higher-layer signaling;

the second offset value is an integer; or the second offset value is associated with an SRS resource set, the SRS resource set comprising at least one target resource.

4. The method according to claim 1, wherein in a case that the DCI comprises an SRS resource indicator SRI field, the SRI field is used to indicate at least one set of first power control parameters, wherein the target power control parameter comprises a power control parameter indicated by the SRI field.

5. The method according to claim 4, wherein after receiving the DCI, the method further comprises:

determining at least one set of first power control parameters corresponding to at least one first sequence; wherein the first sequence is a sequence having a mapping relationship with a first value;

the first value comprises any one of the following: a field value of the SRI field and values obtained by respectively superimposing different first offset values on the field value of the SRI field; and the first offset value satisfies at least one of the following:

the first offset value is configured by higher-layer signaling;

the first offset value is an integer; or the first offset value is associated with an SRS resource set, the SRS resource set comprising at least one target resource;

wherein the at least one first sequence is associated with Y SRS resource sets; and one first sequence is associated with at least one SRS resource set, Y being a positive integer; wherein the Y SRS resource sets comprise the different target resources;

or, wherein the SRI field corresponds to at least one field value, and there is a mapping relationship between one field value and one first sequence.

6. The method according to claim 4, wherein the at least one set of first power control parameters indicated by the SRI field is associated with M target resources indicated by the SRI field, wherein M is a positive integer, wherein the M target resources satisfy at least one of the following:

the M target resources respectively belong to different SRS resource sets; or all SRS resources in an SRS resource group belong to a same SRS resource set.

7. The method according to claim 1, wherein before the determining, based on the DCI, a target power control parameter corresponding to the PUSCH transmission, the method further comprises:

determining at least one set of second power control parameters in a plurality of sets of second power control parameters configured by higher-layer signaling; wherein the target power control parameter comprises at least one of the following:

a power control parameter in the at least one set of first power control parameters; or a power control parameter in the at least one set of second power control parameters.

8. The method according to claim 7, wherein in a case that the DCI contains no SRI field, one set of second power control parameters comprises at least two second power control parameters;

wherein one set of second power control parameters corresponds to one index; and the at least one set of second power control parameters is at least one set of second power control parameters corresponding to a target index in the plurality of sets of second power control parameters; wherein the target index is obtained based on a third offset value on the basis of a preset index; and the third offset value satisfies at least one of the following:

the third offset value is configured by higher-layer signaling;

the third offset value is an integer; or the third offset value is associated with an SRS resource set, the SRS resource set comprising at least one target resource;

wherein the target power control parameter comprises a target third power control parameter; and the determining, based on the DCI, a target power control parameter corresponding to the PUSCH transmission comprises:

in a case that the at least one set of first power control parameters and the at least one set of second power control parameters both comprise a third power control parameter, determining, based on a field value of an open-loop power control parameter set indication field in the DCI, the target third power control parameter from the at least one set of first power control parameters and the at least one set of second power control parameters;

or, wherein the determining at least one set of second power control parameters in a plurality of sets of second power control parameters configured by higher-layer signaling comprises:

in a case that the DCI contains the SRI field, determining at least one set of second power control parameters corresponding to at least one second sequence based on a sequence configuration of the at least one second sequence contained in higher-layer signaling; wherein the second sequence is a sequence having a mapping relationship with a second value;

the second value comprises any one of the following: a field value of the SRI field and values obtained by respectively superimposing different fourth offset values on the field value of the SRI field; and the fourth offset value satisfies at least one of the following:

the fourth offset value is configured by higher-layer signaling;

the fourth offset value is an integer; or the fourth offset value is associated with an SRS resource set, the SRS resource set comprising at least one target resource.

9. The method according to claim 8, wherein the open-loop power control parameter set indication field contains X significant bits, and each group of significant bits of the open-loop power control parameter set indication field corresponds to one target resource; wherein X is an integer greater than 1.

10. The method according to claim 9, wherein a value of any one group of significant bits of the open-loop power control parameter set indication field is used to indicate: a target third power control parameter associated with a target resource corresponding to the any one group of significant bits.

11. The method according to claim 1, wherein at least one piece of time-frequency resource information for the PUSCH transmission corresponds to at least one set of power control parameters; wherein the time-frequency resource information is used to indicate any one of the following:

at least one transmission occasion of the PUSCH;

a time-frequency resource for each frequency hopping of the PUSCH; and a plurality of time-domain resources in a first transmission occasion of the PUSCH, one time-domain resource comprising a plurality of consecutive orthogonal frequency division multiplexing (OFDM) symbols; wherein the first transmission occasion is one of the at least one transmission occasion; and the target power control parameter comprises a power control parameter in the at least one set of power control parameters.

12. The method according to claim 11, wherein one transmission occasion corresponds to at least one set of power control parameters;

or, the first transmission occasion corresponds to at least two sets of power control parameters, each of the time-domain resources in the first transmission occasion corresponds to one set of power control parameters.

13. The method according to claim 12, wherein target resources associated with the plurality of consecutive OFDM symbols are the same; or target resources associated with the plurality of consecutive OFDM symbols are the same target resources associated with power control parameters corresponding to the plurality of consecutive OFDM symbols.

14. The method according to claim 1, wherein after the determining, based on the DCI, a target power control parameter corresponding to the PUSCH transmission, the method further comprises:

performing K times of frequency hopping for the PUSCH, wherein each frequency hopping of the PUSCH corresponds to a set of power control parameters, and K is an integer greater than or equal to 1; and adjusting transmit power for the PUSCH according to a power control parameter corresponding to each frequency hopping during each frequency hopping of the PUSCH.

15. The method according to claim 14, wherein each frequency hopping of the PUSCH satisfies any one of the following:

different frequency hopping points corresponding to transmission occasions for the PUSCH are associated with different target resources; or each frequency hopping point and corresponding power control parameters of the frequency hopping point are associated with same target resources.

16. The method according to claim 1, wherein the DCI further comprises a closed-loop power control adjustment state index and a power adjustment value corresponding to the closed-loop power control adjustment state index; wherein the target power control parameter comprises the power adjustment value.

17. The method according to claim 16, wherein a TPC field in the DCI is used to indicate the power adjustment value, and a size of the TPC field is indicated by higher-layer signaling.

18. The method according to claim 1, wherein the target resource maintains a plurality of closed-loop power control adjustment states; wherein the closed-loop power control adjustment state satisfies at least one of the following:

the closed-loop power control adjustment state is indicated by higher-layer signaling; or the closed-loop power control adjustment state is associated with an SRS resource set; wherein the SRS resource set comprises the target resource.

19. UE, comprising a processor, a memory, and a program or instructions stored in the memory and capable of running on the processor, wherein when the program or instructions are executed by the processor, the following steps are implemented:

receiving DCI, wherein the DCI is used to schedule PUSCH transmission; the PUSCH transmission is associated with different target resources; and the target resource comprises a plurality of SRS resources, wherein the plurality of SRS resources come from different SRS resource sets;

determining at least one set of first power control parameters in a case that the DCI contains no SRS resource indicator SRI field, the at least one set of first power control parameters comprises a parameter indicating at least one set of pathloss reference signals, the at least one set of pathloss reference signals is determined based on multiple sets of pathloss reference signals indicated by a plurality of consecutive indexes starting from a first preset index; and determining, based on the DCI, a target power control parameter corresponding to the PUSCH transmission, wherein the target power control parameter is a power control parameter in the at least one set of first power control parameters.

20. The UE according to claim 19, wherein in a case that the DCI comprises an SRS resource indicator SRI field, the SRI field is used to indicate the at least one set of first power control parameters, wherein the target power control parameter comprises a power control parameter indicated by the SRI field.

* * * * *